United States Patent [19]

Langdon

[11] 4,281,199

[45] Jul. 28, 1981

[54] POLYALKYLENE POLYAMINE ETHER DERIVATIVES OF POLYOXYALKYLENE COMPOUNDS

[75] Inventor: William K. Langdon, Grosse Ile, Mich.

[73] Assignee: BASF Wyandotte Corporation, Wyandotte, Mich.

[21] Appl. No.: 78,544

[22] Filed: Sep. 24, 1979

Related U.S. Application Data

[63] Continuation-in-part of Ser. No. 866,205, Jun. 3, 1978, abandoned.

[51] Int. Cl.³ .................... C08G 59/14; C08G 65/32
[52] U.S. Cl. .................... 564/475; 525/403; 528/405; 528/111; 564/476; 210/736; 162/164 EP
[58] Field of Search .................... 260/584 B; 528/405; 525/403; 564/475

[56] References Cited

U.S. PATENT DOCUMENTS

| | | | |
|---|---|---|---|
| 3,251,852 | 5/1966 | DeGroote et al. | 260/309.6 |
| 3,331,788 | 7/1967 | Lorensen et al. | 260/2 |
| 3,347,803 | 10/1967 | Frotscher et al. | 260/2 |
| 3,515,698 | 6/1970 | Mauz et al. | 260/75 |
| 3,691,110 | 9/1972 | Ohfaka et al. | 260/2 EP |
| 3,746,678 | 7/1973 | Dick et al. | 260/2 A |
| 3,753,931 | 8/1973 | Raspanti | 260/2 BP |
| 4,056,510 | 11/1977 | Symm et al. | 260/47 EP |
| 4,178,434 | 12/1979 | Langdon | 528/405 |
| 4,191,820 | 3/1980 | Langdon | 528/405 |

*Primary Examiner*—Earl A. Nielsen
*Attorney, Agent, or Firm*—Joseph D. Michaels; Arnold S. Weintraub

[57] ABSTRACT

Polyamines are prepared by first reacting a polyoxyalkylene polyol having one to eight active hydrogen sites with an epihalohydrin. The resulting polyether is, then, reacted with an amine to replace the chlorine atoms with amine functions. The polyamines hereof are useful as intermediates for preparing cationic polyelectrolytes, such as drainage aids and the like.

9 Claims, No Drawings

POLYALKYLENE POLYAMINE ETHER DERIVATIVES OF POLYOXYALKYLENE COMPOUNDS

CROSS-REFERENCE TO RELATED APPLICATIONS

This application is a continuation-in-part application of copending United States Patent Application Ser. No. 866,205, now abandoned, filed June 3, 1978, for "Polyalkylene Polyamine Ether Derivatives of Polyoxyalkylene Compounds", the disclosure of which is hereby incorporated by reference.

BACKGROUND OF THE INVENTION

1. Field of the Invention

The present invention pertains to polyamine compounds. More particularly, the present invention pertains to polyamine ether compounds and methods of preparation therefor. Even more particularly, the present invention concerns polyamines derived from polyoxyalkylene polyols and methods of preparation thereof.

2. Background of the Invention

The fundamental reaction of an amine and a halogen-containing polyether is, of course, well documented. The resulting polyether amine products enjoy a wide range of utility; including, utility as intermediates for the preparation of paper product-related items, such as drainage aids, wet and dry strength additives and the like.

These amine containing ethers are, also, useful as cross-linking agents for synthetic resins such as ureas and urethanes.

The full gamut of utility has been documented in patents as well as scientific journals.

An alternative class of compounds known in the art are the polyoxyalkylene polyamines. Ordinarily, such compounds are prepared by the direct amination of a polyoxyalkylene glycol. Such compounds, of course, are, also, of wide-ranging utility.

Another method of preparing these polyamines comprises reacting the hydroxyl groups of the glycol with acrylonitrile to produce cyanoethyl ethers and hydrogenation of the nitrile groups to give amino groups. However, these methods provide only one amine function per terminal hydroxyl group and do not provide polyamines, as contemplated by the present invention.

The art is constantly striving to define new and economically attractive polyamine ethers and their attendant resultants. The present invention, as will subsequently be detailed, provides new polyamine ethers. Furthermore, these new polyamines incorporate therewithin the polyoxyalkylene moieties as well as moieties derived from an epihalohydrin.

STATEMENT OF RELEVANT ART

To the best of applicant's knowledge the most closely related art is found in: U.S. Pat. Nos. 3,607,792, 3,331,788, 2,537,726, 3,753,931, 2,601,597, 3,746,678, 2,898,349, 3,251,852, 2,174,762, 3,691,110, 3,347,803, 4,056,510, 3,515,698.

SUMMARY OF THE INVENTION

In accordance with the present invention polyamine ethers are prepared by reacting an amine with a polyether derived from the reaction of a hydroxyl-containing compound having from one to eight active hydrogen sites and a halogenated epoxide.

The amine may be either an alkylene polyamine or a polyalkylene polyamine. The amine may be primary or secondary.

The hydroxyl-containing compound used herein is, preferably, a polyoxyalkylene polyol having from one to eight hydroxyl groups.

The halogenated epoxide is, preferably, an epihalohydrin.

The products hereof are prepared by reacting the polyol and the epihalohydrin in the presence of a suitable catalyst for about 0.5 to five hours at a temperature ranging from about 30° C. to about 100° C. Thereafter, the amine is reacted with the halohydrin ether at a temperature ranging from about 100° C. to about 150° C. for about one to five hours at a ratio of at least about two moles of amine per chlorine equivalent.

The products hereof, generally, correspond to the formula:

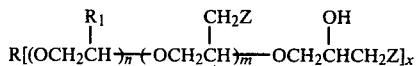

wherein:

R is the residue after, removal of one or more hydroxyl groups, of a hydroxyl compound having 1 to 8 hydroxyl groups;

$R_1$ is $CH_3$ or $C_2H_5$;

Z is the residue, after removal of one or more amino hydrogens, of an amine selected from the group consisting of alkylene polyamine or a polyalkylene polyamine;

n is a number ranging from about 1 to about 100;

m is a number ranging from about 1 to about 30;

X is an integer ranging from 1 to 8.

For a more complete understanding of the present invention reference is made to the following detailed description and accompanying examples.

DESCRIPTION OF THE PREFERRED EMBODIMENT

In accordance with the present invention there is provided polyamine ethers represented by the formula:

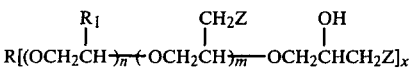

wherein:

R is the residue, after removal of one or more hydroxyl groups, of a hydroxyl containing compound having 1 to 8 hydroxyl groups:

$R_1$ is either $CH_3$ or $C_2H_5$;

Z is the residue, after removal of one or more amino hydrogens, or an amine selected from the group consisting of alkylene polyamine or polyalkylene polyamine;

n is a number ranging from about 1 to about 100;

m is a number ranging from about 1 to about 30; and

X is an integer ranging from 1 to 8.

The ethers hereof are prepared by reacting (1) a hydroxyl-containing compound with a halogenated epoxide and thereafter (2) reacting the product of a (1) with an amine. More specifically, the present ethers are prepared from (1) a hydroxyl-containing compound having from one to eight hydroxyl groups and an epihalohydrin to form an ether and (2) reacting the ether with an amine to replace the available halogen atom.

Suitable hydroxyl-containing compounds contemplated for use herein are polyoxyalkylated derivatives of hydroxyl compounds having from one to eight hydroxyl groups including linear, branched, cyclic and aromatic hydroxy compounds. Suitable hydroxyl compounds include, for example, alkanols, such as methanol, ethanol, propanol, butanol, octanol, dodecanol, octadecanol and so forth, as well as mixtures thereof. Representative polyhydroxy compounds include ethylene glycol, propylene glycol, butylene glycol, glycerol, diglycerol, triglycerol, higher polyglycerols, pentaerythritols, di- and tri-methylolpropane, di- and trimethylolbutane, sucrose, erythritol, sorbitol, mannitol, dextrose and so forth as well as mixtures thereof.

Also, substituted phenols having compatible substituents may be used. Illustrative of such aromatic compounds are phenol, alkyl phenols, such as dodecyl phenol, cresols, nonyl phenol, diphenols such as resorcinol and the like, and aralkyl phenols such as bisphenol and the like.

In addition to the above enumerated hydroxyl compounds, it is to be understood that other polyhydroxyl compounds can be used herein. Such polyhydroxyl compounds which are used to form oxyalkylated derivatives thereof are, for example, aminohydroxy compounds, cyclic alcoholic compounds such as 1,4-dihydroxy cyclohexane, aromatic compounds such as dimethylolbenzene, polyhydroxy phenols, such as hydroquinone and the like, as well as mixtures thereof.

Suitable alkylene oxides are ethylene oxide, propylene oxide, butylene oxides, as well as mixtures thereof.

The oxyalkylated adducts are prepared by the reaction of the selected hydroxyl compound and the alkylene oxide under suitable oxyalkylation conditions.

In practicing the present invention the preferred hydroxyl-containing compound comprises a propylene oxide or butylene oxide adduct of propylene glycol.

The halogenated epoxides utilized herein, are epihalohydrins corresponding to the formula:

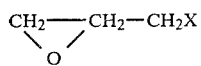

wherein X is halogen. In practicing the present invention, the preferred epihalohydrin is epichlorohydrin.

According to the first step of the process used herein, the polyol and the epihalohydrin are reacted together to form the adduct thereof. Generally, the reaction is carried out at a temperature ranging from about 30° C. to about 100° C. and, preferably, from about 50° C. to about 80° C. The reaction is usually carried out for a period ranging from about 0.5 to five hours, and, preferably, one to three hours.

The reaction is carried out in the presence of a catalyst. Suitable catalysts include those enumerated in U.S. Pat. No. 3,496,120. Exemplifying such catalysts are the Friedel-Crafts type, such as $AlCl_3$, $BF_3$, $ZnCl_2$, $FeCl_3$ etherates; acid catalysts, such as HF, $H_2SO_4$, $H_3PO_4$ and the like. The preferred catalyst is boron trifluoride which is conventionally deployed in the form of an etherate. Generally, about 0.1 to five parts of catalyst, per hundred parts, by weight, of polyol are used.

Generally, the epihalohydrin and hydroxy compound will be employed in an amount equal to or greater than two moles of epihalohydrin per available hydroxyl group.

The so-produced halogenated adduct is, then, reacted with an amine to define the present products. The amine which is reacted with the adduct is, preferably, polyamine of either primary, secondary or tertiary functionality. Monoamines, however, can be used.

Representative of the amines which can be used herein are, preferably, alkyl and alkylene amines which are optimally, saturated compounds containing no double bonds. N-alkyl polyamines, N,N'-dialkyl polyamines, etc. can be used herein, but are not preferred. Other types of amines which may be used herein are found in U.S. Pat. Nos. 2,644,670 and 3,152,188.

In practicing the present invention the preferred amine reactants are primary amines. Thus, monoalkyl amines, alkylenepolyamines, polyalkylene polyamines, cyclic amines and the like can be used herein. Representative monoalkyl amines include methylamine, ethyl amine, propylamine, i-propylamine, n-propylamine, n-butylamine, i-butylamine, t-butylamine and so forth. Representative alkylene polyamines include ethylene diamine, propylene diamine, butylene diamine, and so forth. Suitable polyalkylene polyamines include triaminobutane, diethylene triamine, dipropylenetriamine, triethylenetetraamine, and so forth. Suitable cyclic amines are represented by piperazine and the like. As noted above, if desired, secondary or tertiary amines can be used if quaternary ammonium salts are the desired end products.

In practicing the present invention, the preferred amines are alkylene polyamines and polyalkylene polyamines, such as ethylene diamine, propylene diamine and the like, as well as mixtures thereof.

In reacting the amine with the adduct, generally, in excess of three moles of amine per available halogen atom in the adduct is employed. Less than three moles of amine per available hydrogen atom can be used herein, if desired, by adoption of the method identified in copending U.S. Patent Application Ser. No. 866,206, entitled "Process for Preparing Polyalkylene Polyamine Polyethers", and filed on Jan. 3, 1978.

The reaction normally proceeds at an elevated temperature ranging from about 100° C. to about 150° C., for a period ranging from about 0.5 hours to about twenty-four hours, depending on the nature of the amine reactant. Preferably, the reaction is carried out at a temperature ranging from about 115° C. to about 150° C. for a period ranging from about one to ten hours.

The products produced hereby are useful as intermediates for the preparation of retention aids, dry and wet strength paper additives, flocculants for ore beneficiation, and waste treatment. In addition, the compounds hereof are useful as intermediates for the production of cationic and amphoteric surfactants; polyquaternary ammonium salts for ion exchange resins; water thickeners and drainage aids. Also, these compounds may be used as active-hydrogen compounds and as cross-linking agents used in the preparation of epoxy and urethane resins.

It should be noted herein that one of the distinct advantages of the present invention is that there is no or substantially no dioxane formation during the epichlorohydrin-adduct reaction, when employing polyoxypropylene and polyoxybutylene adducts. As is known to those skilled in the art to which the present invention pertains, the reaction between epichlorohydrin and a polyoxyethylene glycol in the presence of a Lewis Acid, such as boron fluoride, results in degradation of the glycol to form dioxane. The amount of dioxane formation can be appreciable depending on the molecular weight of the glycol. The process used to prepare the compositions of this invention provides the distinct advantage that essentially no decomposition to methyl-substituted dioxanes occurs resulting in nearly quantitative conversion of the polyoxyalkylene hydroxyl-compound to chlorine-containing intermediate.

The products produced in accordance herewith, generally, have a molecular weight ranging from about 400 to 12,000 and, preferably, from about 600 to 5,000.

For a more complete understanding of the present invention, reference is made to the following examples illustrating the principles of the present invention. In the examples, which are to be construed as illustrative and not limitative of the invention, all parts are by weight absent contrary indications.

EXAMPLE I

A. ADDUCT PREPARATION

Into a two-liter flask equipped with a stirrer, reflux condenser, addition funnel and a thermometer was added four hundred and thirty-five parts of a polyol comprising an oxypropylated propylene glycol having a hydroxyl number of 258 and two and seven-tenths parts of boron trifluoride etherate, as a catalyst.

The polyol and catalysts were heated in the flask to 60° C. One thousand three hundred and eighty-six parts of epichlorohydrin was then added to the flask, with stirring over a one hundred and sixty-five minute period, while maintaining the temperature between 58° C. and 68° C. Since the reaction was exothermic, a cooling bath was deployed to maintain the denoted temperature range in the flask. Also, during the last half of the epichlorohydrin addition, three additional one part additions of catalyst were made to sustain the reaction. After the addition was completed agitation was maintained for one and one-half hours to ensure complete reaction. Thereafter, the vessel was vacuum stripped at 120° C. at 4 torr and one hundred and twenty-one parts of strippings were recovered.

A yield of one thousand seven hundred and seven parts of a clear, brown viscous liquid was attained. Gas chromatographic analysis of the strippings indicated eighty-three parts of epichlorohydrin. Thus, one thousand three hundred and three parts of epichlorohydrin were consumed. Hence, the adduct was an approximate fourteen mole adduct.

B. POLYAMINE SYNTHESIS

To a one liter reaction flask equipped with agitation means, reflux condenser, thermometer, addition funnel and heating means was charged six hundred parts of ethylene diamine. The diamine was heated to reflux (117° C.) and, then, two hundred and fifty parts of the product of A was then added thereto over an eighty minute period. The temperature in the vessel was controlled by refluxing at a final temperature of 127° C.

After the addition was completed, excess ethylene diamine was vacuum stripped off up to a temperature of 148° C. at 3 torrs. of pressure thereby yielding three hundred and seventy-eight parts of polyether. Based upon the amount of ethylene diamine in the strippings, it was calculated that 2.3 moles of amine had reacted with 2.5 gram atoms of chlorine present in the adduct. The resulting polyamine product was a viscous fluid.

The product was, then, cooled at 120° C. and diluted with three hundred and fifteen parts of water to provide a 54.6% solution of amine hydrochloride useful for preparing a drainage aid for paper pulp.

EXAMPLE II

This example illustrates the utility of the polyamine polyethers hereof.

One hundred parts of the hydrochloride solution finally obtained in Example I was further diluted with ninety-seven parts of water and neutralized with twenty-three parts of a 50% NaOH solution. The resulting solution was, thus, calculated to be a 20% polyamine solution. This polyamine solution was then charged to a reaction vessel equipped with agitation means and heating means.

To the polyamine solution was added, with stirring and at 100° C., one hundred fifty-five and one-half parts of a 20% solution of a bis-chlorohydrin ether of a polyol to provide a paper pulp drainage aid. The polyol was the same as that described in the above referred to copending application, a yield of three hundred seventy-four and one-half parts of drainage aid product was obtained. This product had a number 4 Ford cup viscosity of 39 seconds and a calculated nitrogen content of 2.2%. The product evidenced superior drainage aid properties when tested according to Canadian Freeness procedures.

The polyol reactant used herein was a 400 molecular weight polyoxyethylene glycol having an epichlorohydrin cap thereon.

EXAMPLE III

A. ADDUCT PREPARATION

Using apparatus equipped as in Example I, one thousand sixty-nine parts of a polyoxypropylene glycol having a hydroxyl number of 105 and four parts of boron trifluoride etherate was added to the flask. The flask was heated to 60° C. Thereafter, nine hundred and twenty-five parts of epichlorohydrin was added thereto in a one hundred and seventy minute period. The addition was conducted at a temperature ranging from 62° C. to 70° C., at the 70% addition point and at the end of the addition additional two parts and one part, respectively, of the catalyst was added to the vessel.

After the addition was completed, the contents in the vessel were stirred for an additional one hour at 72° C. to ensure complete reaction. Thereafter, the volatiles were vacuum stripped up to a temperature of 130° C. at 4 torr. One hundred and ninety-four parts of volatiles were recovered. After analysis and correction for epichlorohydrin in the volatiles it was determined that 7.9 moles of epichlorohydrin had reacted with the polyol.

B. POLYAMINE PREPARATION

To a two-liter reaction flask equipped with agitator means, reflux condenser, thermometer, addition funnel and heating means was added nine hundred and sixty parts (16 moles) of ethylene diamine. The diamine was heated to reflux (117° C.). Thereafter, five hundred and seventeen parts (4 Cl equivalents) of the adduct of step A hereof was added thereto over a two hundred and ten minute period. During this time the temperature was raised to 124° C. and controlled thereat by reflux.

After the addition was completed, excess ethylenediamine was stripped by vacuum stripping up to 140° C. at 4 torr. Seven hundred and ninety-nine parts of ethylenediamine were, thus, recovered thereby indicating that 2.7 moles thereof had reacted. The final yield in the vessel was, thus, six hundred and seventy-eight parts of product.

The entire batch of product was then diluted with four hundred and fifty-two parts of water to provide a 60% amine hydrochloride solution.

Having, thus, described the invention what is claimed is:

1. A process for the preparation of a polyamine comprising:
    (a) reacting propylene oxide, a butylene oxide or mixtures thereof with a hydroxyl compound having from one to eight hydroxyl groups,
    (b) reacting the oxyalkylated hydroxyl compound of (a) with an epihalohydrin,
    (c) reacting the product of (b) with a molar excess of amine, and
    wherein there is substantially no dioxane formation when reacting the epihalohydrin with the oxyalkylated hydroxyl compound.
2. The process of claim 1 wherein:
the hydroxyl compound is propylene glycol.
3. The process of claim 1 wherein:
the amine is ethylene diamine.
4. The process of claim 1 wherein:
the hydroxyl compound is propylene glycol, the oxide is propylene oxide and the amine is ethylene diamine.
5. The process of claim 1 wherein:
the oxide is propylene oxide and the hydroxyl compound is propylene glycol.
6. The process of claim 1 wherein:
the epihalohydrin is epichlorohydrin.
7. The process of claim 1 wherein:
the halohydrin adduct and amine are reacted at a temperature of from about 100° C. to about 150° C. for about 0.5 to about twenty-four hours.
8. The process of claim 1 wherein:
the oxide is propylene oxide, the hydroxyl compound is propylene gylcol, the epihalohydrin is epichlorohydrin and the amine is ethylene diamine.
9. The process of claim 1 wherein:
the polyamine has a molecular weight of from about 400 to about 12,000 and corresponds to the formula:

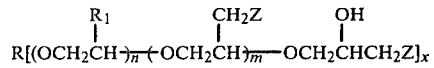

wherein:
R is the residue, after removal of one or more hydroxyl groups, of the hydroxyl compound;
R, is either $CH_3$ or $C_2H_5$;
Z, is the residue, after removal of one or more amine hydrogens, of an amine selected from the group consisting of alkylene polyamine or polyalkylene polyamine;
n is a number ranging from about 1 to about 100;
m is a number ranging from about 1 to about 30; and
X is an integer from 1 to 8.

* * * * *